F. H. PAGE.
MEANS FOR SUPPLYING FUEL TO INTERNAL COMBUSTION ENGINES.
APPLICATION FILED SEPT. 30, 1919.
1,329,997.  Patented Feb. 3, 1920.
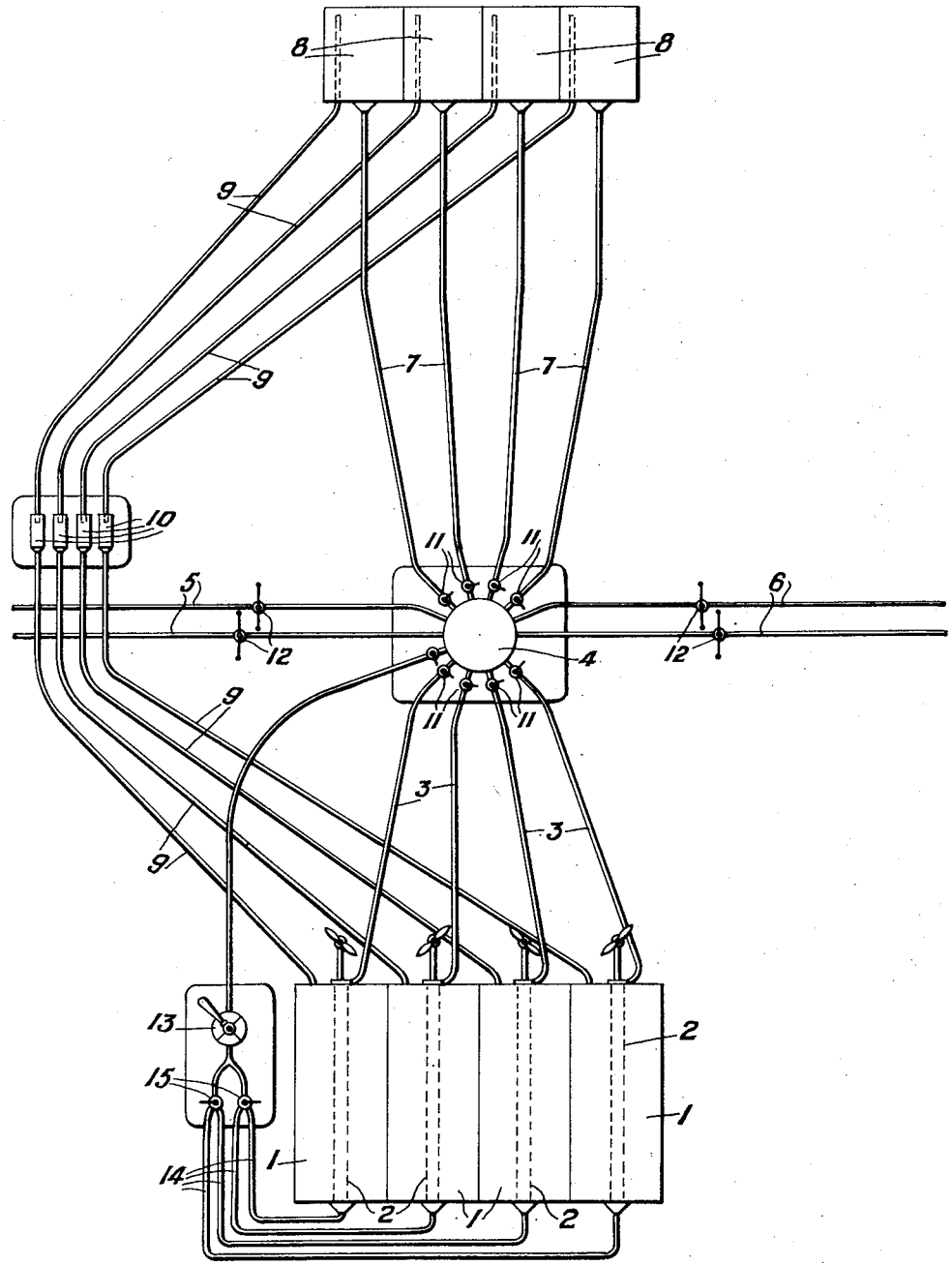

UNITED STATES PATENT OFFICE.

FREDERICK HANDLEY PAGE, OF LONDON, ENGLAND, ASSIGNOR TO HANDLEY PAGE LIMITED, OF CRICKLEWOOD, LONDON, ENGLAND.

MEANS FOR SUPPLYING FUEL TO INTERNAL-COMBUSTION ENGINES.

1,329,997.	Specification of Letters Patent.	Patented Feb. 3, 1920.

Application filed September 30, 1919. Serial No. 327,520.

*To all whom it may concern:*

Be it known that I, FREDERICK HANDLEY PAGE, a subject of the King of Great Britain, residing at London, England, have invented certain new and useful Improvements in Means for Supplying Fuel to Internal-Combustion Engines, of which the following is a specification.

The present invention relates to the supply and control of fuel from a number of independent reservoirs to one or more internal combustion engines.

According to the present invention pipes for fuel from a plurality of reservoirs, and pipes leading to one or more engines are all led into a central control chamber, each pipe being if desired provided with a stop cock or tap.

By this means should any pipe become severed or otherwise damaged, or should damage accrue to a tank or reservoir in the system, or should one of the fuel pumps become inoperative, then the damaged or defective unit in the system can be immediately eliminated without affecting the system as a whole and thereby the running of the engines dependent on said system.

According to this invention, fuel from a series of storage tanks is fed by a number of independent fuel pumps, for instance one or more to each tank, to a common control or distribution chamber or reservoir, by separate pipes each controlled by a tap.

To this distribution chamber are connected the separate pipes, each controlled by a tap, of a plurality of service tanks or reservoirs provided with overflow pipes to the main tanks whereby a constant hydraulic head is maintained in the system.

From this distribution chamber a further set of independent pipes pass to the carbureters or the like devices of one or a number of engines. Each of these pipes may also be tap controlled.

Further if desired a hand pump may be connected by a plurality of pipes, each pipe preferably separately tap controlled, to the main storage tanks and to the distribution chamber to maintain or assist the fuel supply to this chamber when the independent fuel pumps are out of operation.

The taps are preferably arranged in a group or groups or arranged to be controlled from the pilot's seat or other convenient place and means may also be provided at this place for indicating the flow of fuel in any of the pipes of the system.

In the accompanying drawing an example of an arrangement of apparatus for supplying fuel to internal combustion engines on an aircraft according to this invention is shown diagrammatically.

A series of storage or main supply tanks 1 are suitably placed, for instance in the fuselage of an aeroplane, and are each provided with an independent pump 2 and pipes 3 for feeding fuel to a central distribution chamber 4. The pumps 2 are shown in the drawing as being wind driven but if desired they may be driven by the engines of the aeroplane.

From this central distribution chamber 4 pipes 5 and 6 connect with the carbureters of the port and starboard engines respectively and pipes 7 connect with a series of service tanks 8 situated at a higher level on the aircraft. These service tanks 8 are provided with overflow pipes 9, each pipe 9 leading back through an overflow indicator 10 to one of the main supply tanks 1.

The pipes 3 leading from the main tanks 1 and the pipes 7 leading from the central distribution chamber 4 to the upper service tanks 8 are each separately controlled by cocks 11. The pipes 5 and 6 conveying fuel to the engines are also provided with regulating cocks 12 and all these cocks 11 and 12 are preferably arranged so as to be under the direct control of the pilot. A hand pump 13 within convenient reach of the pilot is also provided and connected by a plurality of pipes with the main supply tanks 1, by which means fuel may be pumped from the supply tanks 1 to the central distribution chamber 4 for starting the engines or may assist in supplying fuel to the engines in the event of one or more of the pumps 2 failing. Each of the pipes 14 may be controlled by suitable valves or cocks indicated at 15 within convenient reach of the pilot.

More fuel than is required by the engines will be pumped from the main supply tanks 1 to the distribution chamber 4 and the excess fuel passes through the pipes 7 to the upper tanks 8 and thence through the overflow pipes 9 through the indicator 10 back to the main supply tanks 1. By this arrangement of connections and service tanks, a constant hydraulic head is maintained in the distribution chamber 4 while at the same time any one or more units in the system can be eliminated as described, a constant flow of the fuel being at the same time maintained and indicated to the pilot.

What I claim as my invention and desire to secure by Letters Patent is:—

1. In means for supplying liquid fuel to internal combustion engines; the combination of a plurality of liquid fuel storage tanks, a distributing chamber, a plurality of service tanks located at a higher level than said distributing chamber, a pipe extending from each of said storage tanks to said distributing chamber, a pipe connecting the distributing chamber, with each service tank, pipes extending from said distributing chamber to the engine and means for feeding said liquid fuel from each storage tank through said communicating pipes to said distributing chamber.

2. In means for supplying liquid fuel to internal combustion engines; the combination of a plurality of liquid fuel storage tanks, a distributing chamber, a plurality of service tanks located at a higher level than said distributing chamber, a pipe extending from each of said storage tanks to said distributing chamber, a pipe connecting the distributing chamber with each service tank, pipes extending from said distributing chamber to the engine, each of said pipes being provided with a controlling cock, and means for feeding said liquid fuel from each storage tank through said communicating pipes to said distributing chamber.

3. In means for supplying liquid fuel to internal combustion engines; the combination of a plurality of liquid fuel storage tanks, a distributing chamber, a plurality of service tanks located at a higher level than said distributing chamber, a pipe extending from each of said storage tanks to said distributing chamber, a pipe connecting the distributing chamber with each service tank, pipes extending from said distributing chamber to the engine, each of said pipes being provided with a controlling cock, means for continually feeding said liquid fuel from each storage tank through said communicating pipes to said distributing chamber and an overflow pipe extending from each service tank to each storage tank.

4. In means for supplying liquid fuel to internal combustion engines; the combination of a plurality of liquid fuel storage tanks, a distributing chamber, a plurality of service tanks located at a higher level than said distributing chamber, a pipe extending from each of said storage tanks to said distributing chamber, a pipe connecting the distributing chamber with each service tank, pipes extending from said distributing chamber to the engine, each of said pipes being provided with a controlling cock, means for continually feeding said liquid fuel from each storage tank through said communicating pipes to said distributing chamber and an overflow pipe extending from each service tank to each storage tank, each said overflow pipe being fitted with a sight feed device.

In witness whereof I have hereunto set my hand in the presence of two witnesses.

FREDERICK HANDLEY PAGE.

Witnesses:
  CYRIL GRIFFITH BREWER,
  E. C. WALKER.